No. 851,633. PATENTED APR. 23, 1907.
P. SYNNESTVEDT.
ELECTRIC CONTROL MECHANISM.
APPLICATION FILED AUG. 30, 1904.
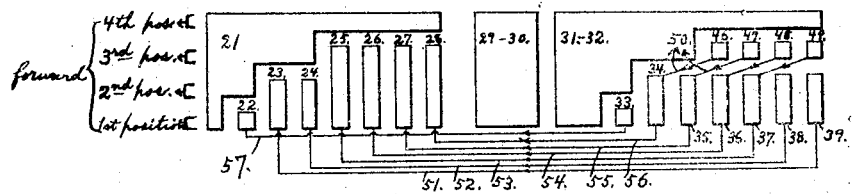
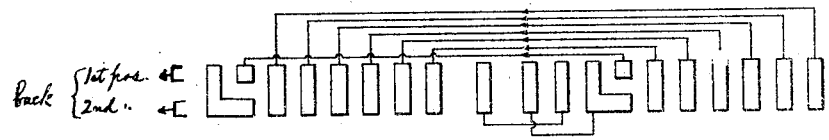
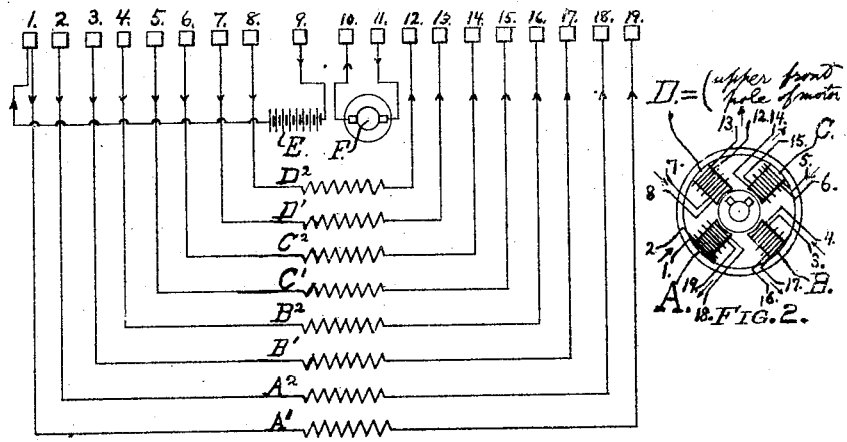
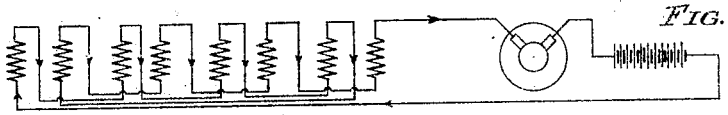
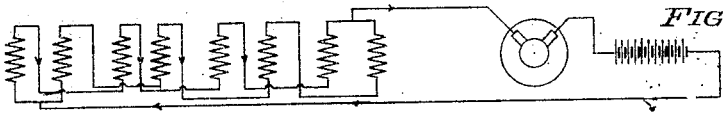
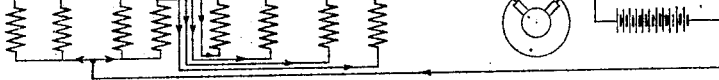
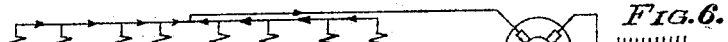
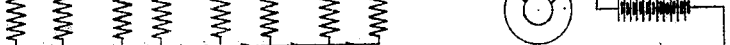

UNITED STATES PATENT OFFICE.

PAUL SYNNESTVEDT, OF PITTSBURG, PENNSYLVANIA, ASSIGNOR TO SYNNESTVEDT MACHINE COMPANY, OF PITTSBURG, PENNSYLVANIA, A CORPORATION OF PENNSYLVANIA.

ELECTRIC CONTROL MECHANISM.

No. 851,683.

Specification of Letters Patent.

Patented April 23, 1907.

Application filed August 30, 1904. Serial No. 222,711.

*To all whom it may concern:*

Be it known that I, PAUL SYNNESTVEDT, a citizen of the United States, residing at Pittsburg, in the county of Allegheny and State of Pennsylvania, have invented certain new and useful Improvements in Electric-Control Mechanism, of which the following is a specification.

The primary object of this present invention is to secure a perfect balance in the magnetic field of a machine having a plurality of commutated field windings, as where the speed control of a motor is obtained by variations in the field windings, as for example where the windings are so connected to a controller and manipulated in the operation of such controller as to place them first in series and then in series multiple and then in multiple connection.

In order that the invention may be better understood I will describe the same in connection with the accompanying drawing, wherein Figure 1 is a diagrammatic representation showing the controller employed together with the diagrammatic indications of the several coils employed on the motor;

Figure 2 is a diagrammatic view representing the preferable form of winding which I employ on the motor;

Figure 3 is a diagram showing the connections of the several field windings in what is called the first forward position;

Figure 4 indicates the connections of the second forward positions;

Figure 5 the connections in the third forward position, and

Figure 6 the connections of the windings in the fourth forward position.

Referring first to Figure 2 it will be seen that I have therein indicated a four-pole motor of the series type having two brush connections, and each pole wound preferably with a double strand of wire laid on the pole parallel so that the entire field contains 8 coils, each coil having two separate terminals, which, as indicated on Figure 1, are carried with the brush leads and one battery lead to fixed contacts on the controller numbered respectively from 1 to 19 inclusive in a four position control mechanism.

The 8 windings of the fields are indicated separately one above another in the lower portion of the diagram in Figure 1, the connections to the ends of the same being so made that the current will enter on the left side and pass out of the windings on the right side as indicated in the diagram, so that the contacts from one to eight inclusive will all carry current outward from the controller as indicated by the arrows in Figure 1 while the contacts 12 to 19 will be the return contacts wherefrom the current will pass to the contact surfaces on the barrel of the controller.

The several field windings are marked in Figure 1, $A^1$, $A^2$, (these two being the windings on pole A), $B^1$—$B^2$, (these two being the windings on pole B), $C^1$—$C^2$, (the windings on pole C), and $D^1$—$D^2$, (the windings on pole D), and on Figure 2 the terminals of the several windings shown are marked with the respective contact numbers to which they are connected to the controller. The arrows on Figure 2 indicate the direction of current produced by the arrangement of Figure 1, with the motor connections as marked and, as will be observed by careful examination of the windings indicated in Figure 2, such direction of current will produce the requisite opposite polarity of adjacent poles necessary to the proper operation of the motor.

The battery is diagrammatically indicated at E and the commutator at F, and it will be observed that one end of the battery, that is the positive connection, leads to contact No. 1 of the controller, as an extra contact is not necessary for that, while the other end leads to contact No. 9, while the brush leads of the commutator are connected to contacts Nos. 10 and 11 respectively, as clearly shown in the diagram of Figure 1.

Referring now to the operation of the controlling mechanism considering the forward positions, and having special reference to Figure 1 and Figures 3 to 6 inclusive, it will be seen that when the barrel of the controller containing the movable contacts numbered respectively 21 to 49, is turned to the position marked first forward position, (Fig. 1) the lower edge or extremity of the contact 21 will register with the fixed contact 1, and so all along the line permitting the current to flow from the battery by contact 1, down through the field coil $A^1$ and back by contact 19 where it is taken by movable contact 39 and wire connection 51 to movable contact 27 thence by fixed contact 3 through field winding B¹ and back by fixed contact 17 and movable contact 37 and wire 53 to movable contact 25 and fixed contact 5 and so on around the circuit, it being observed that the current in this position travels in series through one coil on each pole all around the field and then is returned by means of the wire 57 on the barrel of the controller and the contacts 22 and 2 so as to be carried in series through the remaining coil on each pole making another circuit of the fields. In this position therefore all of the field winding is in series, and the field winding in turn is in series with the armature, and all parts of the motor must take of course the same flow of current, as any break in the circuit anywhere will stop the flow of current altogether. With all of the windings as in this position, in series, it is therefore immaterial what the order is in which the current enters or flows through them, but it will be seen on examination of the flow of current indicated in Figure 4, which is the second forward position, that it now becomes of importance since the field is cut in half as it were all the way around, that is, it is arranged in series parallel, each of the parallel strands embracing in turn all four poles, and therefore by the disposition of the several contacts and windings shown I have produced a condition in which the current in the second position flows in parallel by adjacent windings, all around the motor, each series being independent of the other series, the current finally uniting again and passing to the brush contacts. The object of this is to balance the circuit on the poles so that in this position (the 2nd) if there should be a defective contact on any of the field connections, as for example the connection marked 2, producing a reduced flow of current, such reduced flow of current through the winding connected with that contact, that is the winding marked A², would not only be balanced by a corresponding reduction in the current through the opposite winding which would be the winding C² of the pole C, which is opposite to the pole A, but would also in this (2nd) position similarly affect all four poles.—In other words an open circuit in the field wherever it may occur will in this position have like effect all around the motor. It will also appear that in the balancing effect thus produced the number of poles is immaterial. Thus for any reduction in the flow of current in any portion of the field winding a corresponding reduction is made in other parts of the field and if the circuit should be broken altogether on contact No. 2 the result would be to cut out altogether one half the windings all around the field and the motor would still run in a balanced field, with all poles active, but more resistance in the windings.

Of course on account of the nature of the commutation in the second position any break of that character in any one of the field contacts will cut out one half of the field, the half being composed of a half winding on each pole, no matter where the break may occur. Not only does this arrangement operate in the manner indicated in case of a total stoppage of flow in any portion of the field windings, but it will compensate as suggested above where there is only partial flow, as will result, sometimes from a defective contact which is yet not altogether open circuited or from a difference in the amount of wire or the carrying capacity of the wire on any particular coil, in which case oppositely disposed coils or windings will take just the corresponding amount of current so as to balance up the motor.

Observing the arrangement of the windings in Figure 5 it will be seen that each half winding that is each separate coil on each field is arranged so as to be in series independently with its corresponding half coil on the opposite pole, so that if a half of a complete field winding on one pole is cut out, then a corresponding half or single coil will cut out on the opposite pole (see Figure 5). This it will be observed will be true no matter which of the windings may be cut out or whether it be on poles A, B, C or D.

Of course so far as the fourth position indicated in Figure 6 is concerned the cutting out of any one of the windings will unbalance the field to a small extent, but this is not so material there because there are eight conductors parallel in that position and the effect is not so pronounced as it has been found by experiment to be in the case of the other positions, as for example in the second and third position, where according to other windings which have been tried by me it has been found that if a bad contact develops on a controller so as to cut out one coil, unless an opposite coil also cuts out the unbalance produced in the field will cause the motor to run hot in the bearing and reduce the efficiency very materially thereby interfering with the successful operation of the machine. With the windings shown on the drawings, I have found by careful experiment that as stated there will be a perfect balance of the field under all conditions of service, even although one or more of the contacts be entirely open-circuited, and with such winding the machine will continue to run without heating at the bearings or other detrimental results (save some slight loss in efficiency) regardless of such disadvantageous conditions.

Another thing to be observed in connection with the arrangement of the contact surfaces on the controller, as shown in the drawing is that the principal leads, that is those which at all times carry the entire current, which are the battery leads and the two brush leads, are so disposed that they are constantly in contact when the machine is running in forward speed regardless of changes from one position to another, in other words the contact parts on the movable part of the controller marked 21, 29—30, and 31, 32, have their widest portions so disposed that they bear on the fixed terminals leading to the battery connections and to the brushes, whereby the breaking which occurs in traveling from one position on the controller to another all takes place on the field connections, and as there are, when heavy current is flowing especially, a number of these field connections the arc is distributed and the detrimental effect thereof very largely done away with.

As a means for affording a return circuit from the contacts Nos. 46, 47, 48 and 49 to the other contacts on the other end of the controller with which these are connected, I have provided a number of short wire connections marked 50 which carry the current back to the contacts 34 and 37 inclusive and thus utilize the return wires from the latter contacts to the other end of the controller and this avoids the necessity of providing a duplicate set of return wires extending clear to the other end of the controller. So far as concerns the operation of the mechanism in the back up, or reverse position, it is of course but a reversal of what occurs on the forward position, the reversal being secured as is usual in motors of this class by reversing the armature leads to change the direction of rotation of the motor.

From a careful study of the above description taken in connection with the accompanying drawing it will be seen that the fundamental feature disclosed in connection with this improvement consists in so arranging the commutation of a commutated field, that the current when it flows in series multiple through the windings thereof will flow through adjacent windings in multiple, and such windings will be connected individually or separately in series with corresponding oppositely disposed windings, whereby to maintain at all times a perfect balance in the magnetic field. It will be seen that if, as indicated in Figure 5, after the current has flown in multiple through the four windings shown at the left of that figure the terminals of said windings should be connected together by a single conductor and that conductor then taken over and connected in multiple in turn with the terminals of the four windings at the right of the figure the effect sought would be destroyed because in case any one or more of the windings in multiple were cut out it would not produce any corresponding effect at all on any opposite winding.

Having thus described my invention and illustrated its use, what I claim as new and desire to secure by Letters Patent, is:

1. An improvement in electric controlling mechanism comprising in combination, a magnetic field provided with a plurality of separate windings, such windings being oppositely disposed on said field, and means for connecting said windings in series and for changing said connections to multiple so that the circuit in series multiple position will flow through oppositely disposed windings in series individually, whereby to produce a balance of said fields, substantially as described.

2. An improvement in electric controlling mechanism comprising in combination a plurality of magnetic poles, a plurality of windings on each pole and means for commutating said windings whereby adjacent windings on one pole may be put in multiple circuit and each said winding in separate series connection with an opposite winding, substantially as described.

3. In combination with a motor having opposing poles and multiple parallel windings for each pole, of circuit controlling devices adapted to vary the number of windings through which the current passes successively and at the same time maintain the windings of opposing poles in series, substantially as described.

In testimony whereof I have hereunto set my hand in the presence of the two subscribing witnesses.

PAUL SYNNESTVEDT.

In the presence of—
HERMANN LECHUES,
C. K. HICKS.